US006275173B1

(12) United States Patent
Wu

(10) Patent No.: US 6,275,173 B1
(45) Date of Patent: Aug. 14, 2001

(54) ROTARY ENCODER PRODUCING TWO OUTPUT SIGNALS

(75) Inventor: Chi-Jung Wu, Taoyuan (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/517,040

(22) Filed: Mar. 2, 2000

(30) Foreign Application Priority Data

Mar. 8, 1999 (TW) .............................................. 088103502

(51) Int. Cl.$^{7}$ ....................................................... G01D 5/34
(52) U.S. Cl. ......................................... 341/13; 250/231.13
(58) Field of Search .................................. 341/13, 14, 15; 250/231.13, 231.14, 231.16

(56) References Cited

U.S. PATENT DOCUMENTS 5,786,593 * 7/1998 Ohtomo ................................ 341/13
5,949,067 * 9/1999 Sano ....................................... 341/13

* cited by examiner

*Primary Examiner*—Brian Young
(74) *Attorney, Agent, or Firm*—Ladas & Parry

(57) ABSTRACT

A rotary encoder able to produce a first output signal and a second output signal. The rotary encoder of this invention includes a rotary wheel supported by a frame. An elastic means disposed on the frame provides elastic force to the inside wall of the rotary wheel. A plate is mounted on and rotates with the rotary wheel, and there are a plurality of apertures arranged at a predetermined pitch circularly around an axis of rotation of the plate. An axial rod extends perpendicularly from the center of the plate. Pressure applied to the rotary wheel causes the elastic means to compress and shifts the axis of the wheel and plate such that axial rod contacts a switch and produces the first output signal. A second output signal is produced by a light transmitter located on one side of the plate and a light receiver located on the other side of the plate, wherein the light transmitter and light receiver are arranged so that light passes through an aperture in the plate and is received by the light receiver when rotation of the plate is such that the aperture and the light transmitter are aligned, and light is blocked by the plate when rotation of the plate is such that an aperture and the light transmitter are not aligned.

13 Claims, 7 Drawing Sheets

ROTARY ENCODER PRODUCING TWO OUTPUT SIGNALS

BACKGROUND OF THE INVENTION

1. Field of the Invention

The present invention relates to a rotary encoder able to produce two output signals. More particularly, the present invention relates to a single rotary encoder that can be used as both a shuttle switch and a mode switch.

2. Description of the Related Art

FIGS. 1 and 2 illustrate two rotary encoders according to the prior art. In FIG. 1, a light receiving plate 24 and a light encoding plate 23 are engaged to the cylinder of a fixing base 27 so as to be rotatable about a shaft 11, and an output signal is produced by the rotation of fixing base 27. Similarly, in FIG. 2 a light emitting diode 20 is supported by support 30 so as to transmit light through holes in plate 1 to be received by a light receiver beneath the plate 1 (not shown), by which means a pulse signal is generated by alternating the receiving and not receiving of light by the light receiver. These types of rotary encoder can be applied as a shuttle switch to control a parameter of an electronic device, for example the brightness of a computer monitor.

However, in practical application, an electronic device usually has a plurality of parameters that the user needs to control. For example, a computer monitor might have the parameters brightness, sharpness, and color. To allow control of these three parameters, the monitor would require three shuttle switches. As an alternative, a monitor could include a mode switch for each of the parameters and a single shuttle switch. If the user desired to adjust the contrast, he could press the mode switch corresponding to contrast and then use the shuttle switch for adjusting the value.

In both of these examples, a plurality of switches are required to control a plurality of parameters. This increases the cost of the device.

SUMMARY OF THE INVENTION

It is therefore an object of this invention to provide a single rotary encoder that can provide two output signals and operate as both a shuttle switch and a mode switch.

To achieve the above object, this invention provides a rotary encoder able to produce a first output signal and a second output signal comprising: a rotary wheel having an inside wall; a frame for supporting the rotary wheel; an elastic means disposed on the frame for providing elastic force to the inside wall of the rotary wheel; a plate mounted on and rotating with the rotary wheel, the plate being provided with a plurality of apertures arranged at a predetermined pitch circularly around an axis of rotation of the plate; an axial rod having a distal portion and extending perpendicularly from the plate; a switch disposed in proximity to the distal portion of the axial rod, wherein pressure applied to the rotary wheel will cause the elastic means to compress and shift the axis of the wheel and plate such that axial rod contacts the switch and produces the first output signal; a light transmitter provided on one side of the plate; and a light receiver provided on the other side of the plate; wherein the light transmitter and light receiver are arranged so that light from the light transmitter travels through an aperture in the plate and is received by the light receiver when rotation of the plate is such that the aperture and the light transmitter are aligned, and light from the light transmitter is blocked by the plate when rotation of the plate is such that an aperture and the light transmitter are not aligned; wherein the receiving or not receiving of light by the light receiver produces the second output signal. The elastic means may comprise a spring with a rotating means disposed between the spring and the inner wall of the rotary wheel. The rotating means could be a roller.

BRIEF DESCRIPTION OF DRAWINGS

The following detailed description, given by way of examples and not intended to limit the invention to the embodiments described herein, will best be understood in conjunction with the accompanying drawings, in which.

DETAILED DESCRIPTION OF THE INVENTION

Figure 1:
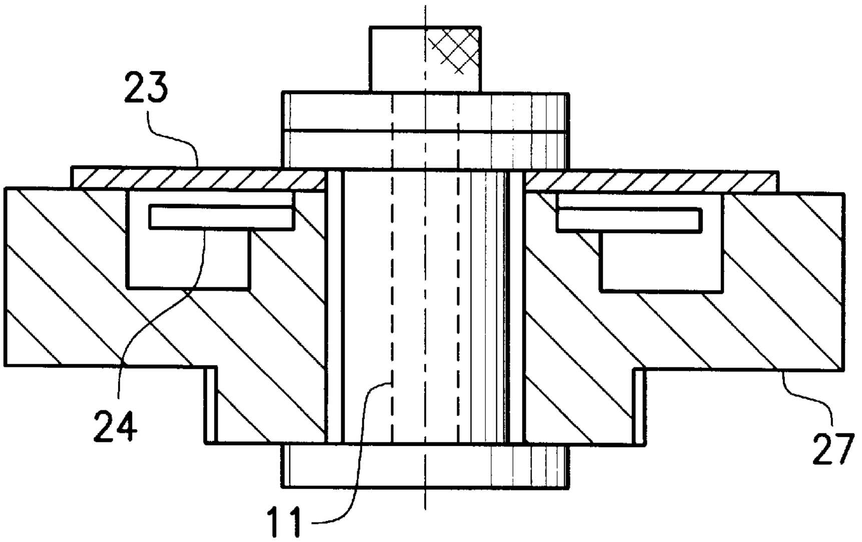
FIG. 1 (PRIOR ART)
FIG. 1 illustrates a rotary encoder of the prior art.
Figure 2:
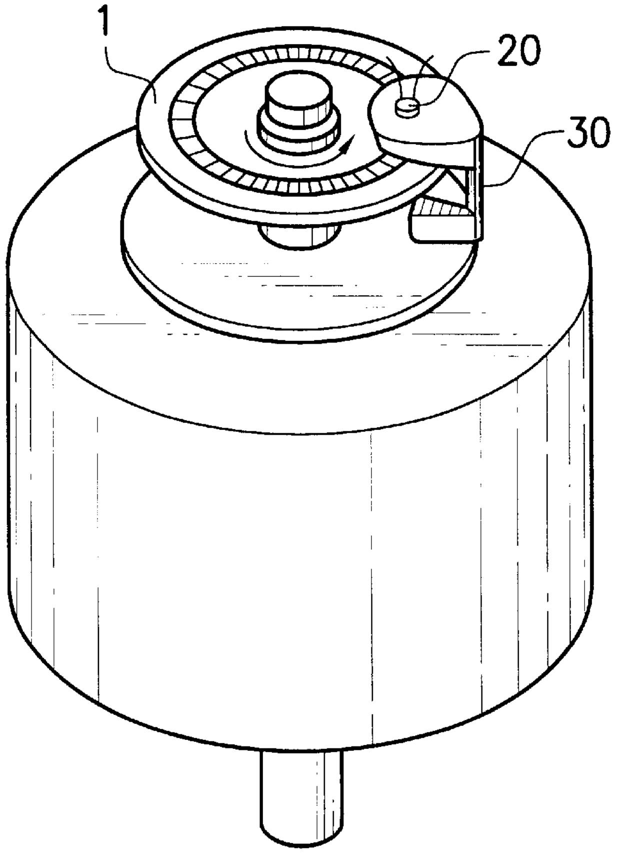
FIG. 2 (PRIOR ART)
FIG. 2 illustrates another rotary encoder of the prior art.
Figure 3A:
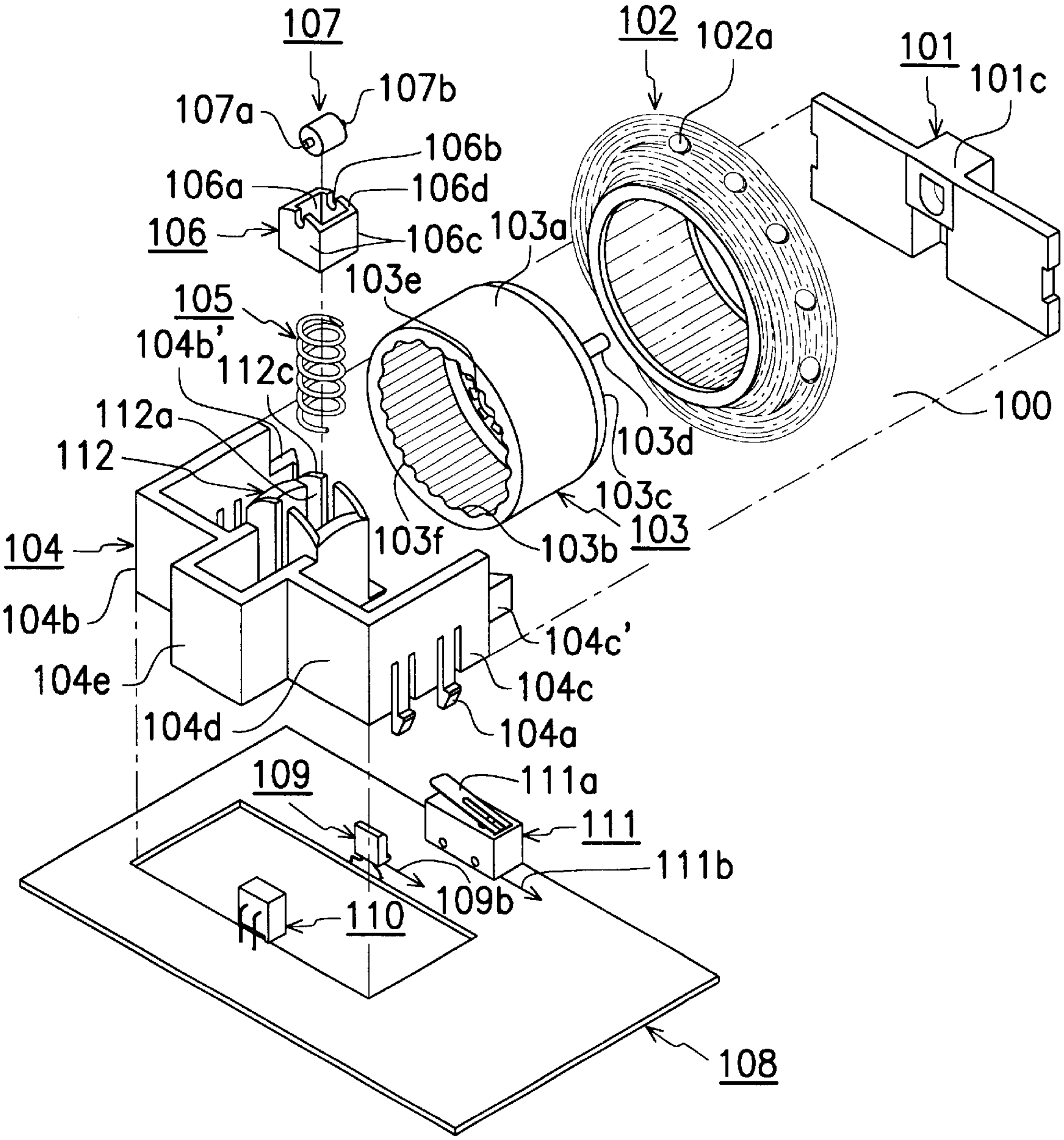
FIGS. 3A and 3B are exploded views of the rotary encoder according to one embodiment of the present invention from a first direction and second direction, respectively.
Figure 3B:
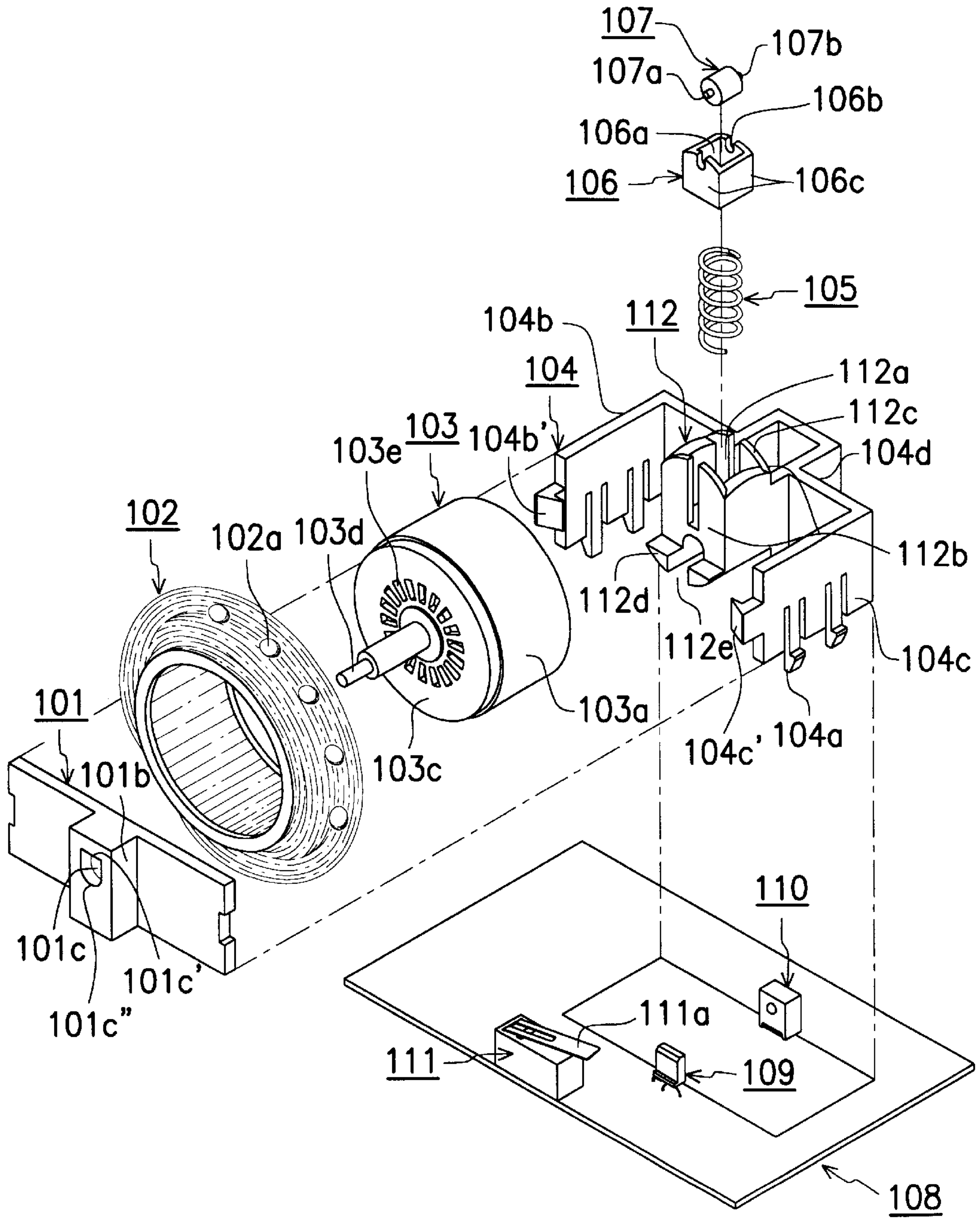

Please refer to FIGS. 3A and 3B. In an embodiment of the present invention, a rotary wheel 103 comprises an outer surface 103*a* and an inner surface 103*b*. The inner surface 103*b* can be provided with ridges 103*f*. A plate 103*c* is mounted at one end of the rotary wheel 103, a plurality of apertures 103*e* being arranged at a predetermined pitch circularly around the axis of rotation of the plate 103*c*. An axial rod 103*d* extends perpendicularly from the center of the plate 103*c*.

A tire 102 can be provided on the outer surface 103*a* of the rotary wheel 103. The tire 102 can be provided with indentations 102*a* for easy manipulation by the user.

The rotary wheel 103 is supported by a frame comprising a proximal portion 104, a distal portion 101, and a central portion 112. The proximal portion 104 has a plurality of hooks 104*a* for providing a firm grip to circuit board 108. Also provided are snap 104*c*' on sidewall 104*c* and snap 104*b*' on sidewall 104*b* for snapping to corresponding grooves in distal portion 101. In the rearwall 104*d* is provided a well 104*e*.

The distal portion 101 is also provided with a well 101*b*, in which a slot 101*c* is formed to allow axial rod 103*d* to pass through.

The central portion 112 shares a wall with the well 104*e* of the proximal portion 104. Both the upper walls 112*c* and the lower walls 112*d* of the central portion 112 are substantially arced in shape; thus, when the inner surface 103*b* of the rotary wheel 103 contacts with either the upper walls 112*c* or the lower walls 102*d*, its rotation is not impeded. A groove 112*e* is formed in the lower walls 112*d* so that well 104*e* is communicated by line of sight to well 101*b*.

A spring 105 is disposed in the well 112*a* of the central portion 112. Over the spring is provided a support 106 and a roller 107. The support 106 has a well 106*a* and grooves 106*b* in the upper surface 106*d* of sidewalls 106*c*. The grooves 106*b* receive the rods 107*a* and 107*b* of roller 107 when it is cradled in well 106*a*. The upper surfaces 106*d* are also substantially arced in shape.

On the circuit board 108 are disposed light transmitter 110, light receiver 109 and switch 111 with a metal spring leaf 111*a*.

The assembly of the rotary encoder of this embodiment will now be described. First, the tire 102 is disposed on the rotary wheel 103. The open end of the rotary wheel 103 is then placed over the central portion 112 such that the roller 107 is in contact with and providing elastic pressure to the inside wall 103*b* of the rotary wheel 103. The proximal portion 104 and the distal portion 101 of the frame are then snapped together by snaps 104*b*' and 104*c*' and the corresponding grooves in distal portion 101. Note the end of the axial rod 103*d* passes through the slot 101*c* and extends therefrom. The apparatus is then locked onto circuit board 108 by means of hooks 104*a* such that light receiver 109 is received in well 101*b* and light transmitter 110 is received in well 104*e*. Furthermore, the end of the axial rod 103*d* passing through the slot 101*c* is in the proximity of the spring leaf 111*a* of the switch 111.

The operation of the rotary encoder of this embodiment will now be described. The rotary encoder of this invention produces two output signals. The first output signal produced by contact of the end of the axial rod 103*d* and the spring leaf 111*a* of the switch 111. This contact is achieved as follows. When no external pressure is being applied to the rotary wheel 103, the spring 105 provides an elastic pressure upon the support 106 and the roller 107 to the inside surface 103*b* of the rotary wheel 103. In this situation, the inner surface 103*b* is lifted away from the upper walls 112*c* of the central portion 112, and the axial rod 103*d* is in contact with the upper portion 101*C*' in slot 101*c*, which acts as a stop to the movement of the rotary wheel 103 in the direction of the elastic pressure. Furthermore, the roller 107 in contact with the inner surface 103*b* of the rotary wheel 103 also allows the free rotation of the rotary wheel 103. When in this position, the axial rod is 103*d* passes through slot 101*c* and is in the proximity of spring leaf 111*a*.

When external pressure is applied to the rotary wheel 103, the spring 105 is compressed. In this situation, the axial rod 103*d* is pushed to the lower portion 101C" in slot 101C, which acts as a stop to the movement of the rotary wheel 103 in the direction of the external pressure, while the opposite side of the inner surface 103*b* is pressed away from the lower walls 112*d* of the central portion 112. Thus, the axis of the rotary wheel 103 and the plate 103*c* mounted thereon shifts in the direction of the external pressure, thereby causing the axial rod 103*d* to shift position in slot 101*c*. This shift causes the axial rod 103*d* to come contact with the spring leaf 111*a* and urge it to contact a contact point on the switch 111 and output the first signal along path 111*b*.

Note that when the spring 105 is compressed by external pressure, the substantially arced shape of the upper walls 112*c* allows the rotary wheel 103 to rotate even when in contact with the upper walls 112*c*. Furthermore, the roller 107 in contact with the inner surface 103*b* of the rotary wheel 103 still allows the free rotation of the rotary wheel 103 when external pressure is applied.

Figure 7A:
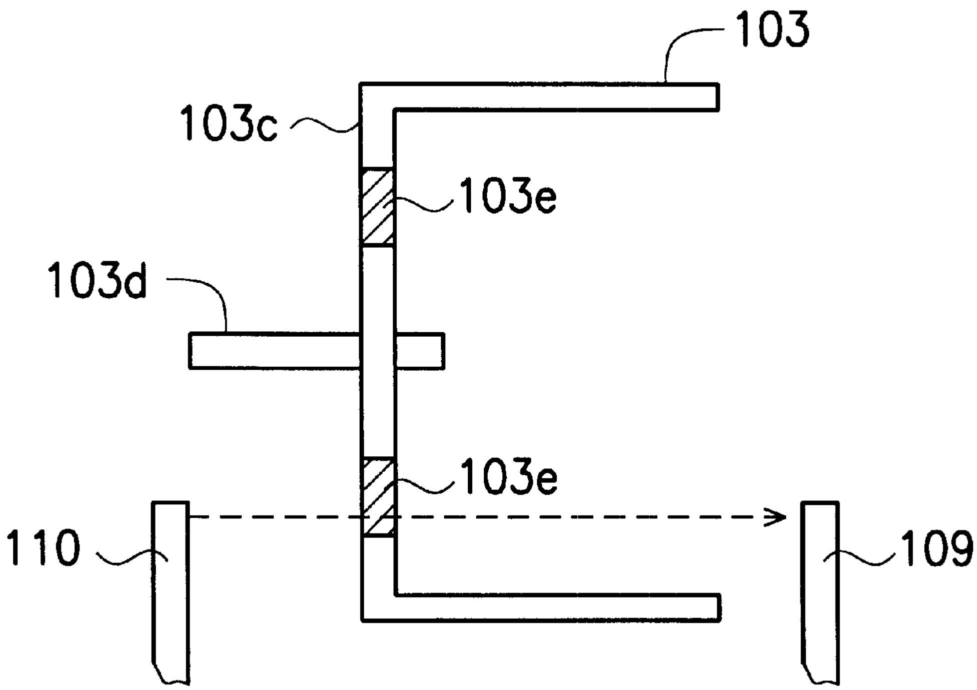
FIG. 7A illustrates the alignment of an aperture and the light transmitter and receiver in the rotary encoder of the present invention.

The second output signal is produced by the interaction of the light receiver 109, the light transmitter 110, and the rotation of the apertures 103*e* in the plate 103*c* . Referring to FIG. 7A, the light transmitter 110 and light receiver 109 are arranged on the circuit board 108 so that light from the light transmitter 110 travels through an aperture 103*e* in the plate 103*c* and through the groove 112*e* in central portion 112 to be received by the light receiver 109 when the position of the plate 103*c* is such that the aperture 103*e* and the light transmitter 110 are aligned. Rotation of the plate 103*c* will shift the position of the apertures 103*e* so that an aperture 103*e* and the light transmitter 110 are not aligned, and therefore light from the light transmitter 110 is blocked by the plate 103*c* . Further rotation of the plate 103*c* will further shift the position of the apertures 103*e* so that an aperture 103*e* and the light transmitter 110 are again aligned (as in FIG. 7A), and therefore light from the light transmitter 110 may again be received by light receiver 109. The receiving or not receiving of light by the light receiver 109 produces the second output signal in the form of a pulse generated along path 109*b* each time the rotary wheel 103 is rotated a number of degrees corresponding to the pitch of the apertures.

If provided, ridges 103*f* can control the ease of this rotation by providing extra friction to the inner surface 103*b*.

Figure 7B:
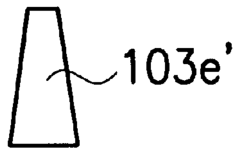
FIG. 7B illustrates a preferred shape for an aperture.

Furthermore, the apertures 103*e*' can be substantially trapezoidal in shape, as shown in FIG. 7B. Another embodiment of the rotary encoder will now be described. When no external pressure is being applied to the rotary wheel 103, the spring 105 provides an elastic pressure upon the support 106 and the roller 107 to the inside surface 103*b* of the rotary wheel 103. In this situation, the light transmitter 110 and light receiver 109 are arranged on the circuit board 108 so that light from the light transmitter 110 travels through the groove 112*e* in central portion 112 and through the aperture 103*e*' in the plate 103*c* to be received fully by the light receiver 109 when the position of the plate 103*c* is such that the aperture 103*e*' and the light transmitter 110 are aligned. When the spring 105 is compressed by external pressure, the aperture 103*e*' is moved in the direction of the external pressure so that light from the light transmitter 110 travels through the aperture 103*e*' to be decreased. Then the changing of light received by the light receiver 109 produces the first signal.

Figure 4A:
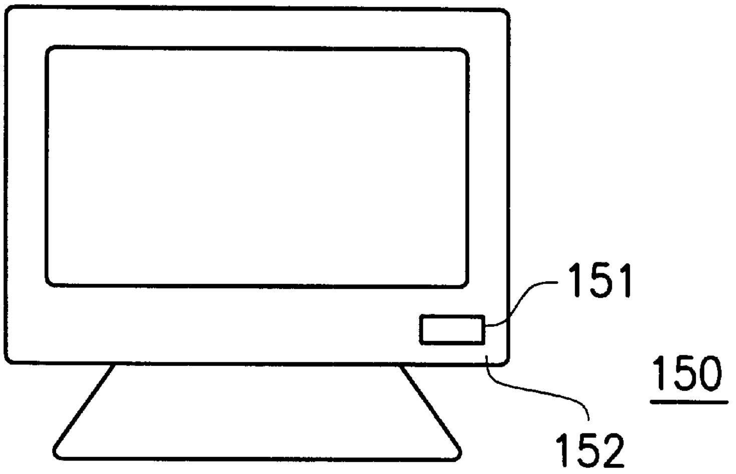
FIGS. 4A and 4B illustrate the application of the rotary encoder of the present invention to a monitor.
Figure 4B:
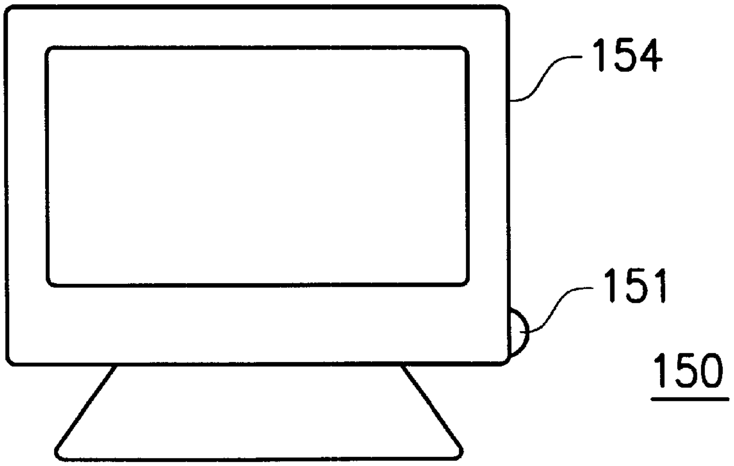

The rotary encoder of this invention could be used to control the parameters of an electronic device such as a computer monitor. FIG. 4A illustrates the positioning of a rotary encoder 151 on the front face 152 of a monitor 150. FIG. 4B illustrates the positioning of a rotary encoder 151 on the side 154 of a monitor 150. In operation, an OSD (On Screen Display) could be activated by pressing the rotary encoder 151 to produce a first output signal. The OSD, as controlled by the computer microprocessor, could provide a menu of parameters to be controlled. By repeatedly pressing the rotary encoder 151, the user could scroll through the menu until reaching the parameter he would like to adjust, for example brightness. Then the user could rotate the rotary encoder 102 to provide a second output signal and change the value of the selected parameter.

Figure 5:
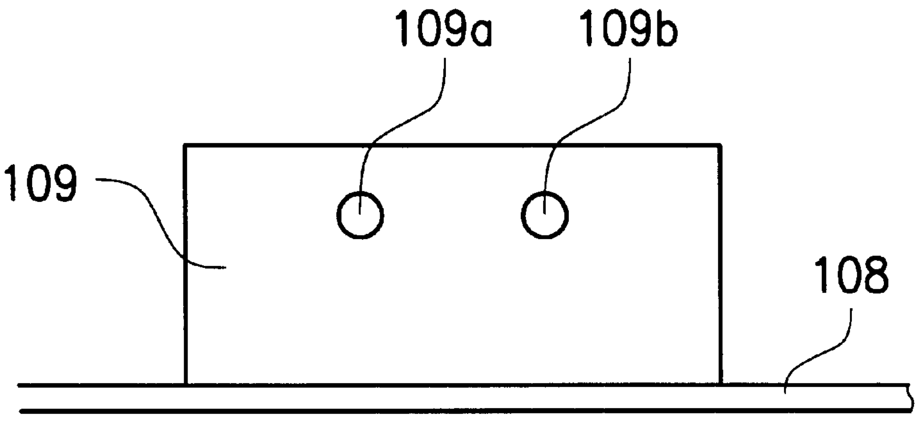
FIG. 5 illustrates the light receiver of the rotary encoder of the present invention according to a second embodiment.

FIG. 5 illustrates another embodiment of the light receiver 109 in the optical encoder of this invention. In this embodiment, there are two optical units 109*a* and 109*b* for receiving light transmitted from light transmitter 110. When an aperture 103*e* is unaligned with the light receiver 109, neither optical units 109*a* and 109*b* receive light transmitted from light transmitter 110. If the plate 103*c* is rotated in a first direction, then the optical unit 109*a* will be the first to receive light, followed by a fully aligned state in which both optical units 109*a* and 109*b* receive light. If the plate 103*c* is rotated in a second direction, then the optical unit 109*b* will be the first to receive light, followed by a fully aligned state in which both optical units 109*a* and 109*b* receive light. Thus, the order of pulses triggered by the detection of light by optical units 109*a* and 109*b* can be used to determine the direction of rotation of the rotary wheel 103. In the above described practical application of the rotary encoder of this invention to a monitor, this embodiment would allow the user to control a parameter, for example brightness, by either increasing or decreasing its value.

Figure 6A:
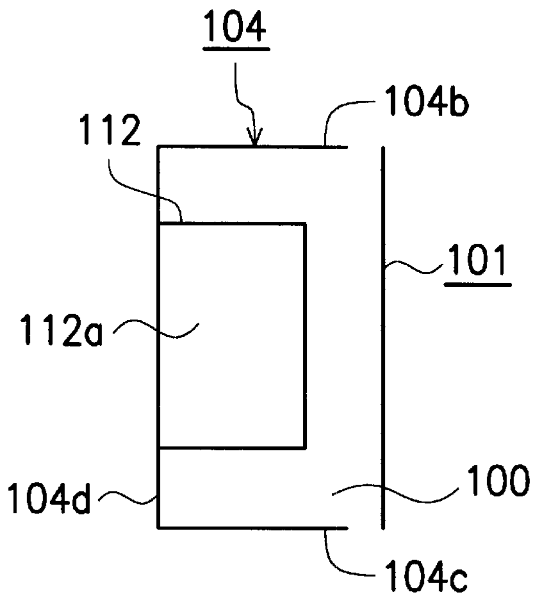
FIGS. 6A–6C illustrate alternative embodiments for the structure of the frame of the rotary encoder of the present invention.
Figure 6B:
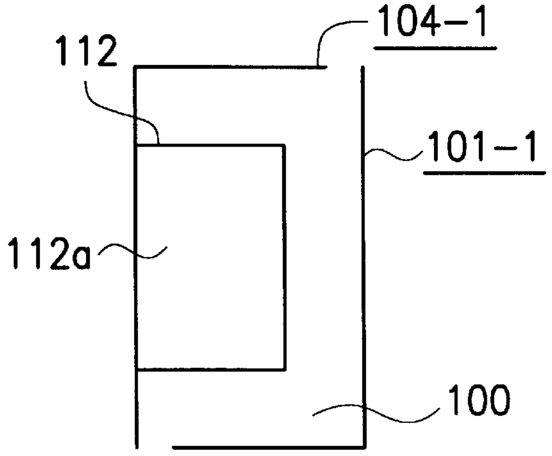
Figure 6C:
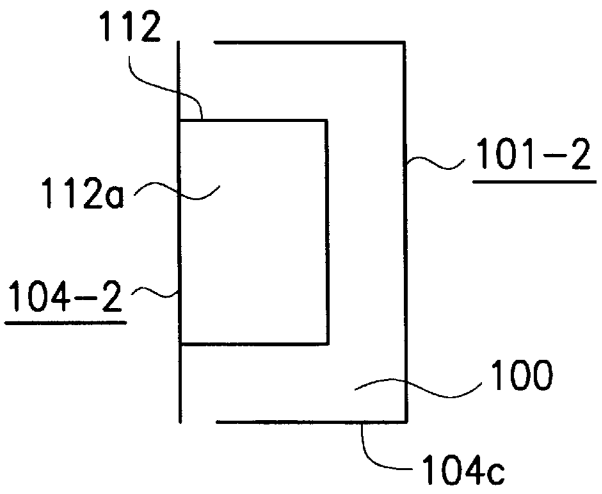

In the above described embodiments, the structure of the frame supporting the rotary wheel 103 comprises a U-shaped proximal portion 104 to which the central portion 112 is attached and a straight shaped distal portion 101, as shown in FIG. 6A. However, other embodiments of the frame structure will be apparent to those skilled in the art. For example, FIG. 6B shows a frame structure in which proximal portion 104-1 and distal portion 101-1 are both L-shaped, while FIG. 6C shows a frame structure in which proximal portion 104-2 is straight shaped and distal portion 101-2 is U-shaped.

While the invention has been described with reference to various illustrative embodiments, the description is not intended to be construed in a limiting sense. Various modifications of the illustrative embodiments, as well as other embodiments of the invention, will be apparent to those person skilled in the art upon reference to this description. It is therefore contemplated that the appended claims will cover any such modifications or embodiments as may fall within the scope of the invention defined by the following claims and their equivalents.

What is claimed is:

1. A rotary encoder for producing a first output signal and a second output signal comprising:

a rotary wheel having an inside wall;

a frame for supporting the rotary wheel;

an elastic means disposed on the frame for providing elastic force to the inside wall of the rotary wheel;

a plate mounted on and rotating with the rotary wheel, the plate being provided with a plurality of apertures arranged at a predetermined pitch circularly around an axis of rotation of the plate;

an axial rod having a distal portion and extending perpendicularly from the plate;

a switch disposed in proximity to the distal portion of the axial rod, wherein pressure applied to the rotary wheel will cause the elastic means to compress and shift the axis of the wheel and plate such that axial rod contacts the switch and produces the first output signal;

a light transmitter provided on one side of the plate; and a light receiver provided on the other side of the plate;

wherein the light transmitter and light receiver are arranged so that light from the light transmitter travels through an aperture in the plate and is received by the light receiver when rotation of the plate is such that the aperture and the light transmitter are aligned, and light from the light transmitter is blocked by the plate when rotation of the plate is such that an aperture and the light transmitter are not aligned; wherein the receiving or not receiving of light by the light receiver produces the second output signal.

2. The rotary encoder as claimed in claim 1, wherein the elastic means comprises a spring.

3. The rotary encoder as claimed in claim 2, wherein a rotating means is disposed between the spring and the inner wall of the rotary wheel.

4. The rotary encoder as claimed in claim 3, wherein the rotating means is a roller.

5. The rotary encoder as claimed in claim 1, wherein the inside wall of the rotary wheel is ridged.

6. The rotary encoder as claimed in claim 1, wherein the apertures are substantially trapezoidal in shape.

7. The rotary encoder as claimed in claim 1, wherein the switch is a limit switch comprising:

a spring leaf made of metal; and a switch body engaged with the spring leaf and having a contact point on the surface, wherein pressure applied to the rotary wheel will cause the elastic means to compress and shift the axis of the wheel and plate such that axial rod contacts the spring leaf and urges it into contact with the contact point, thus producing the first output signal.

8. The rotary encoder as claimed in claim 1, wherein a tire is disposed on the outside of the rotary wheel.

9. The rotary encoder as claimed in claim 8, wherein the tire is provided with indentations for easy manipulation by a user.

10. The rotary encoder as claimed in claim 1, wherein the light receiver comprises two optical units for detecting light.

11. A rotary encoder for producing a first output signal and a second output signal comprising:

a rotary wheel having an inside wall;

a frame for supporting the rotary wheel;

an elastic means disposed on the frame for providing elastic force to the inside wall of the rotary wheel;

a plate mounted on and rotating with the rotary wheel, the plate being provided with a plurality of apertures arranged at a predetermined pitch circularly around an axis of rotation of the plate;

a light transmitter provided on one side of the plate; and a light receiver provided on the other side of the plate;

wherein the light transmitter and light receiver are arranged so that light from the light transmitter travels through an aperture in the plate and is received by the light receiver when rotation of the plate is such that the aperture and the light transmitter are aligned, and light from the light transmitter is blocked by the plate when rotation of the plate is such that the aperture and the light transmitter are not aligned; wherein the receiving or not receiving of light by the light receiver produces the second output signal;

wherein when pressure applied to the rotary wheel will cause the elastic means to compress and shift the axis of the wheel and plate such that the aperture is moved in the direction of the pressure so that light changed by the aperture; wherein the receiving of light by the light receiver produces the first output signal.

12. The rotary encoder as claimed in claim 11, wherein the apertures are substantially trapezoidal in shape.

13. The rotary encoder as claimed in claim 12, wherein the aperture is moved in the direction of the pressure so that light decreased by the aperture.

* * * * *